United States Patent [19]
Supkis et al.

[11] 3,806,956
[45] Apr. 30, 1974

[54] PROCESS FOR USING COATED ABRASIVE PRODUCTS

[75] Inventors: Stanley J. Supkis, Averill Park; Henry J. Swiatek, Schenectady, both of N.Y.

[73] Assignee: Norton Company, Troy, N.Y.

[22] Filed: Nov. 30, 1972

[21] Appl. No.: 310,986

Related U.S. Application Data

[62] Division of Ser. No. 47,786, June 19, 1970, abandoned.

[52] U.S. Cl. .................... 51/281 R, 51/295, 51/298
[51] Int. Cl. ........................ C08g 51/12, B24b 1/02
[58] Field of Search ...................... 51/295, 298, 281

[56] References Cited
UNITED STATES PATENTS

| | | | |
|---|---|---|---|
| 3,331,667 | 7/1967 | Schnabel | 51/298 |
| 3,541,739 | 11/1970 | Byron et al. | 51/295 |
| 3,232,729 | 2/1966 | Holland | 51/298 |
| 3,011,882 | 12/1961 | Quinan | 51/298 |
| 3,619,150 | 11/1971 | Rinker et al. | 51/298 |

*Primary Examiner*—Donald J. Arnold
*Attorney, Agent, or Firm*—Herbert L. Gatewood

[57] ABSTRACT

Coated abrasive articles are provided which have at the exposed grinding surface a supersize layer which facilitates grinding. Such a layer comprises a polymeric material and in the most preferred embodiment an active filler. The presence of this layer on the coated abrasive article results in a much cooler grinding operation thus reducing the conditions conducive to metal glazing thereby permitting extended coated abrasive product life.

2 Claims, 1 Drawing Figure

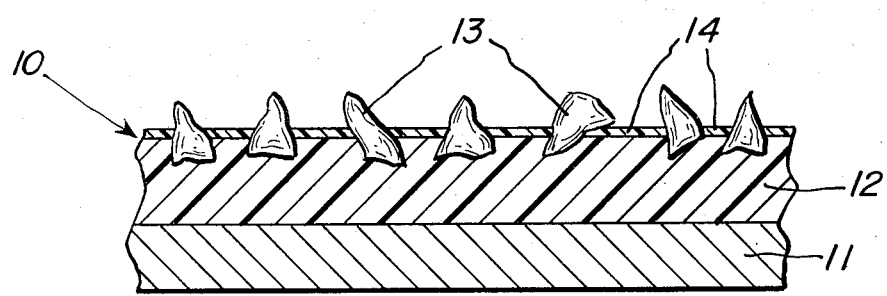

PROCESS FOR USING COATED ABRASIVE PRODUCTS

This is a division, of application Ser. No. 47786, filed June 19, 1970 and now abandoned.

BACKGROUND OF THE INVENTION

1. Field of the Invention

This invention relates to new improved coated abrasive articles, and their method of use.

2. Description of the Prior Art

Coated abrasives, which have been manufactured for many years and are commonly referred to as "sandpaper," are in general made by continuously applying to a suitable relatively wide backing material, a first coat of an adhesive composition, which is referred to in the art as a "making" coat, followed by the immediate application of abrasive grains. The making coat is solidified to hold the grains on the backing material, after which, in most instances, an adhesive composition referred to as a "sand sizing" coat is applied and solidified. These coats constitute the bond for the abrasive grain. Afterwards, the coated abrasive material thus prepared is then processed into forms more suitable for use such as sheets, rolls, belts and discs.

The use of coated abrasive articles is occasioned, in general, with a relatively high initial rate of cut. However, during use, for various reasons, the rate of cut decreases and when it falls to a rate below economic usefulness the coated abrasive article is discarded. One of the primary reasons for this decrease in cutting rate, and attendant with it a change in surface finish, resides in the fact that a freshly exposed metal surface is extremely reactive. Such a fresh or nascent metal surface, e.g., the metal swarf, often forms a weld with the abrasive grain; apparently in some cases at least by means of a chemical reaction. On the other hand, some metals at their freshly exposed surface oxidize thus forming a metal oxide skin which, in general, is usually harder than the parent metal. These phenomena result, in further usage, in an extremely high shearing force on the abrasive grain which is occasioned with even higher temperatures. Thus the welding phenomenon, as hereinafter more fully described, is rendered even more severe.

The abrasive grains initially effective in cutting are those extending furthest from the backing member because, as is obvious, these grains first come into contact with the metal being ground. When these abrasive grains form weld junctures, frictional forces exerted thereupon by the workpiece increases, and one by one the abrasive grains are either broken off or upon failure of the grit bond are wrenched free of the backing material. Because numerous of these further extending abrasive grains are removed, the abrading plane is lowered and abrasive grains become effective which do not extend from the backing material so far as the initially effective abrasive grains. As the abrading plane more nearly approaches the backing member, welded abrasive grains become more and more numerous. Ultimately "glazing over" of the abrasive surface occurs.

One may already have concluded from the above that an interrelationship exists between stock removal temperature and glazing. Factors which tend to raise the local instantaneous temperature at the workpiece-abrasive interface appear to promote glazing, welding, and related chemical reactions. Thus glazing of a coated abrasive material is self-accelerating in that any increase in temperature at the workpiece-abrasive interface due to friction promotes further glazing. Further glazing in turn results in higher frictional forces and temperatures at the workpiece-abrasive interface. Undesirably, the temperature may reach a point at which the metal workpiece becomes "burned" or discolored due to heat.

Glazing, which is of course known to be more of a problem in the abrading of some metals, in general softer metals, than with others, often occurs when there is yet a substantial portion of the abrasive grains remaining, i.e., not worn down. Consequently, the abrasive material is rendered commercially useless while the backing member is still in effective condition and before a complete loss of abrasive grain occurs. When glazing occurs in a grinding operation, a large number of abrasive belts and the like is generally necessary to accomplish a desired surface finish. This, as is obvious, is accompanied by corresponding high material cost. Moreover, extra time and effort is consumed during the replacing of a useless abrasive belt with a new one.

Various means over the years have been devised to eliminate or at least reduce the glazing problem. In general, these means approach the problem in an attempt to reduce friction between the abrasive grains and the metal surface being abraded. The use of waxes and grease sticks, oils and similar lubricants have been suggested for use from time to time during the abrading process. These techniques are effective only to a limited degree, and the advantages are frequently offset by the attendant inconvenience, expense and smudging of the workpice. Water or oil floods at the point of grinding, in addition to being inconvenient and expensive are messy. Water necessitates the use of a waterproof coated abrasive and oil is a potential fire hazard; the use of either requires special equipment. Moreover, while lubricants such as water and oil have been found to retard glazing, for the most part they do not prevent it from ultimately occurring or do they, in all cases, preclude at least some metal oxide film from being formed on the metal surface.

In the grinding of certain metals, e.g., titanium, some cutting lubricants must be clearly avoided. The use of, e.g., a highly chlorinated oil in the grinding of titanium, it has been discovered, will produce adverse effects on titanium metal surfaces. In later applications of metal ground using these lubricants, stress corrosion cracking has occurred at high temperatures. This is believed due to residual materials left on the metal from the abrading operation which make for the cracking. Whatever the reason, chlorinated grinding fluids are carefully avoided in the grinding of titanium and moreover, to preclude such a potential problem from occurring, in certain instances, titanium metal is ground dry. Because of this, and for other reasons as above and hereinafter pointed out, there has been a keen interest over the years for improved coated abrasive products for use in dry grinding of metals, and in particular titanium metal.

Heretofore others have suggested incorporating a so-called "grinding aid" in the nature of a filler or the like in a coated abrasive product. Merely by way of example attention is directed to U.S. Pat. No. 3,058,819. Therein is disclosed incorporated in the sand size coat an organic sulfur-containing compound such as, e.g., thiourea. Such a compound in a conventional phenol-formaldehyde binder used in the manufacture of coated abrasives, according to the patentee, inhibits glazing and welding of metal to the abrasive grain. In U.S. Pat. No. 3,256,076 the patentee discloses applying to the surface of a coated abrasive sheet material, as a supersize layer, a film-forming material which comprises an organic compound containing a chemically bound substituent which decomposes at the grinding temperature and which, in the presence of normal room humidity, is rapidly reactive with or corrosive to the metal being abraded. The chemically bound constituent is chlorine, bromine or divalent sulfur which on decomposition yield HCl, HBr, and $H_2S$. Such a reaction, according to the patentee, is indicated by a reduction in friction between the abrasive granules and the metal surface being abraded. One may conclude, it is believed that this invention inhibits glazing by lowering the frictional forces in grinding thus lowering the grinding temperature. One further example of prior art is recently issued British Patent No. 1,145,082. Therein the patentee discloses an anti-weld filler in at least the outermost layer of a conventional coated abrasive bond. Such a filler is disclosed to be a simple or complex metal halide, the latter being represented by, e.g., sodium fluoaluminate, i.e., cryolite, and potassium fluoborate (potassium borofluoride).

The mechanism by which these so-called "grinding aids" as above-mentioned and others known in the art, contribute to improved abrasive operation is not clearly established. Several possible mechanisms have been suggested to account for the improved results obtained. In cases where the melting point of the grinding aid is less than the surface temperature of the abrasive grit at the area of contact between the abrasive and the metal being cut, the grinding aid will melt to form a liquid that coats the surface of the abrasive grit. the grinding aid is properly selected, the molten grinding aid serves as a lubricant at the area of contact between the chip and abrasive.

A further possible mechanism appears to be a reaction of the metal chip or swarf with the grinding aid to form a non-adhesive film. The freshly cut metal surface of the chip is highly reactive at the temperature and pressure achieved during the grinding process. If the grinding aid is reactive with any component of metal being ground, and is present near the abrasive-chip interface, it may be expected to corrode the surface of the metal chip. The product of this reaction in the case of certain grinding aids is a non-adhesive film that prevents reaction of the chip with the abrasive and also prevents rewelding of the chip to the base metal.

In accordance with a third possible mechanism, the freshly cut metal surface may react with the grinding aid to produce a product in the form of a lubricating film. This film may have a shear strength low enough to act as a solid film lubricant that provides a means of lubricating the area of contact between the chip and abrasive.

While the mechanisms outlined above provide some general guidance for the selection of useful grinding aids, it is in general not possible to predict accurately the utility of a particular material. This is especially true of blends of different fillers, which in some cases have been found to exhibit a synergistic effect. Thus, because of the lack of universal application, i.e., certain grinding aids produce better results in certain applications than others, the search for improved coated abrasives for dry grinding goes on. Moreover, while some of the prior art coated abrasive products manufactured especially for dry grinding applications have been found suitable to some degree, others, for one reason or another, have been found lacking.

One problem associated with the use of grinding aids, especially those in the nature of fillers, resides in making the grinding aid continually and uniformly available at the metal surface being ground over an extended period of time. These active fillers are, in general, incorporated in a binder therefor which in certain instances, as above-disclosed, is the outermost layer of the bond. Desirably, however, it has now been discovered, the filler should be incorporated in a binder which is applied as a supersize layer to the coated abrasive material. Certain binders, however, have been found totally unsuitable for this purpose in that they, among other things, either do not adhere satisfactorily to the coated abrasive bond at the temperatures attained during grinding or do not have satisfactory cohesive strength at such temperature, or both. Thus, during usage, particles are thrown off from the coated abrasive material. When this occurs the maximum benefit of the grinding aid is not attained and abrasive product life is thereby shortened.

SUMMARY OF THE INVENTION

In its basic aspects, our invention involves providing at the exposed surface of a coated abrasive material a super-size layer comprising a binder material not attendant with the above-mentioned disadvantages, and which most advantageously facilitates grinding in and of itself. The most preferred embodiment of the invention includes as well in the supersize layer a filler material, e.g., a complex metal halide which functions to further aid grinding. The binder material found to meet the requirements of this invention and performing such a dual function as above-mentioned is a carboxylated butadiene-acrylonitrile copolymer.

Such a layer as is provided by this invention has been discovered to result in, in certain grinding applications, a reduction in frictional heat. This, of course, is accompanied with a cooler cutting action which provides less potential for glazing thereby resulting in extended coated abrasive product life as well as more uniform cut over the life of the abrasive product.

Although the coated abrasive product of this invention may be used to advantage in other dry grinding applications, it is particularly useful in the dry grinding of stainless steels and titanium. The ever increasing use of titanium metal in fabrication of various articles, e.g., in the aircraft industry, has made the need for a solution to safer, better, and faster grinding acute.

An important advantage in lowering the grinding temperature is that it presents less opportunity for the metallurgical structure of a workpiece to change, sometimes adversely, during grinding. To avoid "burning" of a titanium workpiece it is conventional, during dry grinding, to allow it to cool periodically. This is accomplished in some cases by dunking the workpiece, from time-to-time, in a bucket of water or the like after which the workpiece is wiped with a dry cloth before again commencing the abrading operation. Quite advantageously the improved coated abrasive product of this invention makes, in some instances, this manner of cooling of the workpiece during grinding of titanium unnecessary.

A further advantage in the use of coated abrasive products according to this invention in grinding of titanium workpieces resides in the fact that grinding is not accompanied with any appreciable sparking. This, in and of itself, makes for a much safer grinding operation as grinding of titanium workpieces is generally accompanied with a voluminous production of sparks.

While I do not wish to be held to any particular theory, the improvements brought about by this invention appear to result from the following possible reaction mechanisms. Before these mechanisms are described, however, I would like to describe what I believe is happening at the surface of the metal during grinding.

When pressure is applied to the surface of the metal being ground through the use of an abrasive product, a dislocation (the crystalline structure is distorted) takes place in the crystalline structure of the metal. This causes a flow of electrons to the surface of the metal, which flow increases with an increase in temperature. Where the thermal conductivity of the metal is relatively poor as in, e.g., titanium, a greater amount of heat is built up at the grinding surface leading to an abundance of electrons on such surface. This flow of electrons to the surface appears to be of the "Kramer Effect" type (L. Grunberg, Brit. J. Appl. Phys. 9,85 (1958)). This may very well be the reason why titanium is so reactive while being ground as compared to other metals which have higher thermal conductivity values. With this as background, we now look to our first theoretical mechanism, that of the Lewis acid concept (electron acceptor).

A Lewis acid, as is well known, is any molecule or ion that can combine with a second molecule or ion by forming a covalent chemical bond with two electrons from the second molecule or ion. At the temperature of grinding, a complex metal halide such as, e.g., sodium fluoborate is known to decompose to a Lewis acid. Thus such a compound is available for reaction with the metal.

When the surface electrons are attacked by the electron acceptor, the metal becomes anodic to a degree thus providing one of the conditions conducive to stress-corrosion cracking. (According to E. H. Dix, Jr. in Trans. Am. Inst. Mining Met. Engrs., 137, 11 (1940) corrosion cracking will occur if the alloy is anodic (becomes positive) and a condition of high stress is present.) The other condition is present because a concentration of stress will be produced at the bottom of the notches (area where metal has already been ground out) formed. As the stress concentration increases, fissures will begin to develop over the entire surface being ground. This cracking occurring simultaneously with abrading makes stock removal much easier and is believed to lead to the increased cut by the abrasive material. As conditions for grinding are improved less energy is required to remove the surface metal, hence resulting in lower grinding temperatures. When one of the conditions is removed, such as the anodic condition by exhaustion of the available electron acceptor, stress corrosion cracking will cease and one is back to the usual abrading process. Thus the longer and more continuously available the grinding aid the longer is the time before conditions become conducive to glazing.

A second theoretical mechanism is postulated for the polymeric binder material. I believe it decomposes at grinding temperature through a free radical mechanism. The available free radicals form a covalent bond with metal at the surface where, as before mentioned, electrons are available for formation of this type bond. Hence, electrons are removed from the surface leaving it, as above-described, anodic and conducive to stress-corrosion cracking.

Thus, it would appear that in this invention grinding may be facilitated by inducing stress-corrosion cracking, and that in the preferred embodiment of the invention stress-corrosion cracking may be occurring by two different mechanisms simultaneous with abrading. The desirability for this occurring is believed unexpected, particularly since it is well known that much research and development effort has been devoted to avoid the occurrence of stress-corrosion cracking in certain metals.

Regardless of the mechanism, however, many advantages, as above and hereinafter pointed out, are found in using a coated abrasive product of this invention.

BRIEF DESCRIPTION OF THE DRAWING

The invention is described hereinafter in greater detail by reference to the drawing which consists of a sole FIGURE showing in cross-section a portion of a coated abrasive material according to the invention. It should be understood, however, that the drawing and examples hereinafter given are shown for purposes of illustration only and that the invention in its broader aspects is not limited thereto.

DETAILED DESCRIPTION OF THE INVENTION

Referring now to the drawing, there is disclosed in the sole FIGURE thereof coated abrasive material 10 comprising a backing member 11, a bond 12, and abrasive grain 13. Adhesive bond 12 may comprise solely a conventional maker coat or it may include, if desired, a size coat. On top of bond 12 is a layer 14, with which this invention is primarily concerned. Such a layer is traditionally referred to in the coated abrasive art as a supersize layer or coat, and in many instances as merely a "supersize."

Backing member 11 can be of any material conventionally used in the manufacture of coated abrasives, e.g. paper, cloth or a laminate of paper plies, cloth plies or a combination of paper and cloth plies or other flexible strong material. The backing member can be filled, if cloth, with any desired filling materials these being well-known in the abrasive industry. Moreover it can be further provided with front and backsize materials as desired.

Bond 12 can be applied to the backing member by any means desired. The manner of application will, of course, depend somewhat on the particular material of the bond; however, these application methods are well known in the abrasive art. The bond, which secures the abrasive grain to the backing member, may be any of the materials conventionally used, e.g. glue, resinous materials such as the phenolics, alkyds, epoxies, urea-formaldehyde, and the like. The bond can be solely a maker coat or it can include a size coat as well. Where a size coat is provided it may be of the same material as the maker coat or it may be of different material, as desired. The material used as the bond will, of course, depend on the properties desired in the ultimate coated abrasive product. Merely by way of example, the maker coat may be glue with a phenol-formadehyde size coat or, both the maker and size coats may be phenol-formaldehyde.

The abrasive grain can be of any desired material, e.g. silicon carbide, garnet, crushed fused alumina, zirconia-alumina etc. all of which are conventionally used in the manufacture of coated abrasive products. Any size grain can be used depending only on the particular finish desired.

The preferred abrasive material, however, used in the practice of this invention comprises a cloth backing member having a resin maker and sand size coat and including either silicone carbide or aluminum oxide grain. These coated abrasive materials are well known and their manufacture per se forms no part of this invention. This being the case and since there are many references to their manufacture in the patent art the manufacture of these materials will not be described in any detail. In general, however, coated abrasive material is manufactured by providing on a backing member a liquid adhesive composition after which abrasive grains are deposited on the adhesive composition and the adhesive composition is allowed to cure or set up.

Layer 14 which forms the heart of this invention comprises a binder which at the relatively high temperatures attained during grinding has good adhesion and cohesion properties and desirably softens without blistering. Preferably such a layer also includes dispersed therein a metal halide filler, the most preferred fillers being complex alkali and alkaline earth halides. Suitable halides include, e.g. sodium aluminum hexafluoride, sodium silicofluoride, and sodium fluoborate.

The binder material, which is the most critical aspect of the invention, is a carboxylated butadiene-acrylonitrile copolymer available commercially from Standard Brands Chemical Industries, Inc. (formerly International Latex Corporation) in the form of a non-ionically stabilized latex under the trade designation TYLAC. Such a carboxylated copolymer latex and its manner of manufacture is believed disclosed in U.S. Pat. Nos. 2,961,348; 3,256,234; and 3,422,050 the disclosures of which are herein incorporated by reference. As disclosed therein carboxylation occurs through introduction of an ethylenically unsaturated monocarboxylic acid e.g. acrylic and methacrylic acid, or a partial ester of unsaturated polybasic acids, e.g. itaconic, fumaric, and maleic acid into the polymeric chain. A carboxylated copolymer found particularly suitable in the practice of this invention is available in latex form identified by the trade designation TYLAC TM3502A and is believed to comprise by weight dry solids about 17 percent acrylonitrile and from about 1–3 percent carboxylate, the remainder being substantially butadiene.

Layer 14 is deposited from the latex composition above-described which in the preferred formulation also includes a suitable amount of filler to give the result desired in grinding. Such a composition, as is usual in the coating art, also includes compatible wetting and stabilizing agents. The latter is necessary to prevent the latex solids from salting out on adding the active filler. Such agents, as will provide an optimum coating composition, are deemed well known in the art and require no explanation here.

A suitable composition for coating has been found in a latex composition comprising about 50 percent or more total solids. Such a composition is prepared by adding to a commercially available 40 percent latex composition a weight of filler equal to the latex solids. When this composition is roll coated and spread with an air knife, a uniform appearing layer results. With a lesser solids content application by roll coating is possible, however, one obtains on drying a layer having a mottled or non-uniform appearance. Even so, when the same amounts of composition are applied the results in grinding are comparable. The solids content preferably comprises a 50:50 (% by weight) latex solids and active filler. However, a solids content as low as 30 percent by weight active filler has been found satisfactory. The filler most preferred is a complex sodium halide, this being soluble in the aqueous vehicle for the polymeric binder whereby on application and subsequent drying the filler is well dispersed throughout layer 14.

The amount of latex composition applied, as is deemed obvious, will of course depend on a number of factors e.g. size of abrasive grain, spacing of the grain, solids content, etc.. The main consideration to keep in mind is that, in general, it is desirable to apply a sufficient quantity of latex composition so that on drying and during use of the coated abrasive the deposited layer will as be closely adjacent the surface of the metal being ground as possible. This feature is not shown in the drawing since for the sake of clarity and to emphasize preference for tips being uncoated, a larger portion of abrasive grain is exposed than is desirable. However, it is in general undesirable, that the abrasive grains be entirely covered over. This generally leads to merely smearing the layer 14 on the surface to be cut thus resulting in relatively little cut. The tips of the abrasive grain on the coated abrasive product being used must at least be exposed and if not must be so exposed on application of pressure at the start of the grinding operation. Where layer 14 covers over the abrasive grain tips, these products are unsuitable in off-hand grinding operations; however, where higher pressures are encountered, e.g. mechanical automatic grinding, the fact that the abrasive grain tips are covered over initially is of less consequence. Generally speaking, however, in coarser grade abrasive products a greater amount of supersize is deposited on the surface thereof than with finer or polishing grades. However, the optimum amount of latex composition applied as well as the exact solids formulation thereof for any particular grinding application is best determined by a few simple experiments in the laboratory.

Subsequent to application the latex composition is dried to remove the water therefrom and to bring about curing of the carboxylated copolymer. The drying time required, depends, of course, on such factors as air temperature, amount of water present in the latex composition, and the like. However, merely by way of example, satisfactory drying can be accomplished, in general, by heating with air at 100°F for about 30 minutes. Afterwards, the dried deposit can be cured by heating at 225°F for about 10 minutes. Obviously, curing can be accomplished at room temperature, however, this takes much longer.

The thus manufactured coated abrasive material is then further processed into forms more suitable for use in grinding operations such as sheets, rolls, belts and discs.

The following specific examples will illustrate more clearly the preferred embodiments of our invention.

EXAMPLE I

Four strips of coated abrasive material (for manufacture of belts 2½ inches wide and 60 inches long) were obtained from coated abrasive sheet material conventionally used in metal grinding applications. This coated abrasive material had a resinous phenol-formaldehyde maker and sandsize adhesive, grade 60 silicon carbide abrasive grain, and a backing of standard drills cotton cloth. This coated abrasive material is commonly referred to in the trade by the designation 60X R/R DURITE abrasive cloth OPK.. One of these strips was used as a control; the other strips of abrasive material were provided with a supersize layer having the compositions indicated below.

On the second strip was provided a supersize layer comprising sodium fluoborate (Na BF$_4$) and ethyl cellulose. This layer was provided on the abrasive strip by brushing on the abrasive surface of the coated abrasive material a composition made up by mixing together on a 1 to 1 ratio (weight basis) sodium fluoborate and a 10 percent (by weight) solution of ethyl cellulose in xylene. Subsequent to application, the wet coated abrasive material was heated by hot air at 225°F for sufficient time to drive off the carrier thus leaving a residuum layer of sodium fluoborate dispersed in a binder of ethyl cellulose.

On the third and fourth abrasive strips, respectively, were provided a supersize layer comprising sodium silicofluoride (Na$_2$SiF$_6$) and sodium fluoborate (NaBF$_4$). These layers were provided on the coated abrasive material by brushing thereon a composition prepared by mixing (27 percent total solids) the halide component in a 60 percent (by weight) solution of Piccolastic E125 in xylene. Piccolastic E125 is a thermoplastic polystyrene resin in granular form having a softening point of 125°C available commercially from Pennsylvania Industrial Chemical Corporation. After application of these supersize compositions, the wet coated abrasive materials were dried to drive off the solvent.

The thus prepared abrasive strips, and the control strip, were then fabricated by usual techniques into endless belts. Grinding tests were then run on the abrasive belts under controlled conditions. The test performed is that conventionally known as a "backstand belt test" wherein, in general, a belt of the above indicated size, positioned horizontally, is moved inwardly at a constant pressure and in a direction substantially normal against a workpiece moving back and forth over a distance of 9¾ inches at 7 feet per minute. The grinding machine used has the capability of providing a variable belt speed of from 0 SFPM to 6750 SFPM (surface feet per minute). A 55 durometer, rubber, vertically disposed, serrated contact wheel (7 inches diameter) was used. The belts were all evaluated in the same manner on a titanium workpiece at a belt speed of 2250 SFPM with a 15 lb. dead weight. The workpiece was removed every two minutes and the amount of cut determined. The following cumulative results were obtained.

| Belt | Supersize Composition Active Filler | Binder | Time (Min.) | Cut In Grams |
|---|---|---|---|---|
| 1 | None | None | 14.0 | 17.0 |
| 2 | NaBF$_4$ | Ethyl Cellulose | 14.0 | 38.5* |
| 3 | NaBF$_4$ | Polystyrene | 14.0 | 37.0 |
| 4 | Na$_2$SiF$_6$ | Polystyrene | 14.0 | 40.5 |

*used 17 lb. dead weight

While all the belts containing a filler showed improvement in cut over the control belt, the supersize layer flaked-off during grinding. Although this was less of a problem with the polystyrene binder than with ethyl cellulose, the polystyrene binder was observed to blister on the edges of the belt. This apparently results from heat build-up in the supersize layer and leads to pick-off of this layer or portions thereof during use.

EXAMPLE 2

In this example belts like belts 3 and 4 in Example 1 were evaluated in grinding of titanium on the same grinding machine at 5500 SFPM. The same pressure was used as in Example 1.

| Belt | Supersize Composition Active Filler | Binder | Time (Min.) | Cut In Grams |
|---|---|---|---|---|
| Control | None | None | 4.0* | 9.0 |
| 3 | NaBF$_4$ | Polystyrene | 14.0 | 34.5 |
| 4 | Na$_2$SiF$_6$ | Polystyrene | 4** | 5.0 |

* stopped cutting
** metal welded to grain

One can see from the above data that the belt having the supersize layer thereon containing sodium silicofluoride does not perform as well at the higher grinding speeds as does the belt having the sodium fluoborate containing supersize layer or for that matter, even the control belt having no supersize layer thereon. The reason for this difference in performance is not known for certain and was totally unexpected when it occurred. However, it is believed such a difference in performance may be because NaBF$_4$ releases a more active Lewis acid than does Na$_2$SiF$_6$. Thus at higher grinding speeds, it is more likely that the surface electron produced on the metal will be picked up by the active Lewis acid and not by the less active thereby providing conditions for stress corrosion in the one case and not in the other.

EXAMPLE 3

Coated abrasive belts similar to belt 4 in Example 2 were provided. The belts differed, however, in that aluminum oxide abrasive grain (Grade 80) was used and in the binder component for the sodium silicofluoride. Two different piccolastic materials were used, these being identified by the designations E125 and E75. The last mentioned material has a softening point of 75°C.

These belts were evaluated for their performance in cutting 304 stainless steel. The same grinding apparatus and test procedures were used as in Example 1, a 15 lb. dead weight being used at 5500 SFPM. The results obtained are as follows:

| Supersize Composition Active Filler | Binder | Time (Min.) | Cut In Grams |
|---|---|---|---|
| None (Control) | None | 10 | 90 |
| Na$_2$SiF$_6$ | E75 | 10 | 194 |
| Na$_2$SiF$_6$ | E125 | 10 | 179 |

While in both instances the performance was much better than with the control belt grinding was accompanied with flaking-off of the supersize layer.

EXAMPLE 4

Another binder material for the active filler was evaluated in an attempt to provide a binder having optimum adhesion to the surface of the coated abrasive and cohesive strength.

A conventionally produced coated abrasive sheet material (20 inches wide) identified by the trade designation 60–X R/R DURITE Cloth OPK was coated on the abrasive surface with a composition prepared as follows:

A supersize composition was prepared by adding to a latex composition a suitable amount of sodium fluoborate to provide a 1:1 ratio (by weight) sodium fluoborate to latex solids and to provide a 50 percent total solids content. The latex is available commercially from Standard Brands Chemical Industries, Inc. of Dover, Delaware under the trade designation Tylac TM–3502A. The thus prepared composition at room temperature, e.g. 75°F was applied to the abrasive surface by passing the above coated abrasive material (10.5 fpm) over a partially submerged coating roll (6 inches diameter) rotating in a vessel containing the above composition. After application the coating composition was made smooth and uniformly thick and excess composition was removed by means of a conventional air knife operated at a pressure of 16.6 inches (water) utilizing compressed air at room temperature. The orifice of the air knife was set at an opening of 28 mils, spaced at a distance of three-fourths inch from the coated surface. It was directed at an angle of 45° with respect to the coated web and against the direction of movement thereof.

A sufficient amount of the composition was provided on the coated abrasive web to provide, on subsequent drying and curing, a weight of 7.4 lbs. per sandpaper maker's ream of 480 sheets, 9 inches × 11 inches. The wet coating was air dried for 30 minutes at room temperature (100°F) after which it was heated for 10 minutes at 225°F to cure the binder. Upon curing, the latex binder solids fuse together thus resulting in a rubbery elastomeric material. On examination of the coated abrasive material, the tips of the abrasive grains were exposed sufficiently to be noticeable when running one's fingers over the abrasive surface.

An endless belt as before (2½ inches × 60 inches) was manufactured from the thus coated abrasive material according to usual belt-making techniques. This belt was then evaluated in the grinding of titanium metal on the same grinding apparatus as described in Example 1. The belt speed during the test was 5500 SFPM. The applied load on the metal being ground was 15 lb. dead weight. The results obtained are given below.

| Belt | Time (Min.) | Cut In Grams |
| --- | --- | --- |
| 60-X Control | 8 | 14* |
| 60-X Tylac TM 3502A + Fluoroborate | 8 | 25 |
|  | 14 | 38 |

*burning of workpiece – had to stop.

The supersize layer resulted in not only improved cut but was discovered to have good adhesion with the cured phenol-formaldehyde resin in the size coat as evidenced by no flaking-off during belt usage.

On examination of the workpiece, the surface finish was seen to be finer than is usually provided with such an abrasive grit. Thus, in certain instances, it may be possible to omit further finishing operations normally performed on these metals.

EXAMPLE 5

A coated abrasive belt was prepared as in Example 4 except that the coated abrasive material was 60–X R/R METALITE abrasive cloth. Such an abrasive cloth has aluminum oxide abrasive grain rather than silicon carbide. The performance of this belt was evaluated as before on 304 stainless steel and compared with a belt commercially available (60–X R/R having in its outermost layer of bond an inorganic fluoride, believed to be sodium silicofluoride. Over a 14-minute time period (5500 SFPM, 15 lb. dead weight), the cumulative cut of the belt according to our invention was 346 grams. On the other hand, the competitive belt in the same period of time cut only 239 grams.

Other belts were prepared as in Example 4 except that in one such a belt the abrasive grain was finer (80 grit $Al_2O_3$), and in the other belt a 30 percent solids composition (30 percent sodium fluoboralt) was applied to the abrasive surface (60 grit $Al_2O_3$).

On evaluation as before, the first-mentioned belt cut 270 grams while the latter-mentioned belt cut 274 grams. Thus it is seen that on comparison a greater amount of metal is removed in a belt according to this invention, even with a lesser amount of active filler in the supersize layer or with finer abrasive grain, than with the competitive belt. While the reason for this is not definitely known it is believed, as hereinafter shown, the improved results are attributable to the combination of "grinding aids" used in our invention.

EXAMPLE 6

Abrasive belts were manufactured as in Example 5 except that in all the belts coated abrasive material having grit 80 was used rather than grit 60. One of the belts having no super-size thereon was used as a control while another of the belts contained no filler ($KBF_4$ instead of $NaBF_4$) in the supersize layer. On evaluation as before on stainless steel (5500 SFPM, 15 lb. dead weight) the following results were obtained.

| Belt | Time (Min.) | Cut/Grams |
| --- | --- | --- |
| Control | 14 | 118.0 |
| TYLAC TM3502A | 14 | 140.0 |
| TYLAC TM3502A + $KBF_4$ | 14 | 269.0 |

For means of comparison the filler was incorporated during manufacture of the coated abrasive material in the phenolic size coat (50 percent by weight total solids). In the same grinding application 203.5 grams of metal was removed in 14 minutes. Thus it is seen that regardless of in which layer the filler is incorporated an improved cut results. The greatest improvement, however, results from incorporating the filler in the super-size layer. Quite surprisingly, it is believed, an improved cut was even obtained when utilizing the binder alone without a filler therein.

EXAMPLE 7

A belt was prepared from the same coated abrasive material as in Example 4 except that the supersize composition contained no active filler.

On evaluation (5500 SFPM, 15 lb. dead weight, titanium workpiece as before, the following results were obtained:

| Belt | Time (Min.) | Cut/Grams |
| --- | --- | --- |
| 60-X Control | 6.0 | 12.0 (burned bar) |
| 60-X TYLAC TM 3502A | 10.0 | 21.5 |

The coated abrasive material having the carboxylated butadiene-acrylonitrile binder thereon as a supersize layer but without filler therein provides better grinding performance than is provided by a coated abrasive belt not having a such layer.

EXAMPLE 8

A 2 inch × 132 inch belt was prepared from coated abrasive material having a supersize composition as disclosed in Example 4. The coated abrasive material used is commercially available from Norton Company under the trade designation 50X-Resinall CLK. Metalite abrasive cloth. By such a designation is intended a coated abrasive material having grit 50 $Al_2O_3$ abrasive grain, closely coated on a phenol-formaldehyde maker adhesive and provided with such a resinous size coat.

The thus prepared abrasive belt was evaluated against another commercially available competitive belt of comparable abrasive material but with a different supersize layer thereon on 1704 stainless steel. This evaluation was performed on a Hammond polishing lathe with a power pack unit modified to provide a constant 40 psi on the workpiece during the grinding operation. Such an apparatus has a 70 durometer, serrated contact wheel.

Over the critical initial five-minute period of grinding, the belt according to this invention out-performed the competitive belt. The total cut resulting from our belt was 230.0 gram; however, only 208.2 grams stock was removed by the competitive belt. Moreover, the competitive belt "died out" much earlier than did the belt of our invention.

As many different embodiments of this invention will occur to those skilled in the coated abrasive art, it is to be understood that the specific embodiments of the invention as presented herein are intended by way of illustration only and not limiting upon the invention, but that the limitations thereon are to be determined only from the appended claims.

What we claim is:

1. Process for removing stock from metal workpieces selected from the group consisting of stainless steel and titanium comprising:
   a. providing coated abrasive material wherein in at least the outermost layer the adhesive bond comprises phenol-formaldehyde resin and as a supersize layer thereon a composition comprising a carboxylated butadiene-acrylonitrile copolymer wherein the copolymer comprises about 17 percent by weight acrylonitrile, 1–3 percent carboxylate, the remainder being substantially butadiene; and
   b. applying said abrasive material under pressure contact against the desired metal workpiece whereby a desired amount of stock is removed.

2. Process for removing stock according to claim 1 wherein the supersize layer further comprises sodium fluoborate, said sodium fluoborate being present in the supersize layer in an amount which comprises at least 30 percent by weight of the supersize layer.

* * * * *

UNITED STATES PATENT OFFICE
CERTIFICATE OF CORRECTION

Patent No. 3,806,956            Dated April 30, 1974

Inventor(s) STANLEY J. SUPKIS and HENRY J. SWIATEK

It is certified that error appears in the above-identified patent and that said Letters Patent are hereby corrected as shown below:

Delete the name of Henry J. Swiatek as coinventor.

Signed and sealed this 8th day of October 1974.

(SEAL)
Attest:

McCOY M. GIBSON JR.
Attesting Officer

C. MARSHALL DANN
Commissioner of Patents